(12) United States Patent
Näslund

(10) Patent No.: US 8,014,523 B2
(45) Date of Patent: Sep. 6, 2011

(54) KEY MANAGEMENT

(75) Inventor: Mats Näslund, Vällingby (SE)

(73) Assignee: Ericsson AB, Stockholm (SE)

( * ) Notice: Subject to any disclaimer, the term of this patent is extended or adjusted under 35 U.S.C. 154(b) by 537 days.

(21) Appl. No.: 12/090,185

(22) PCT Filed: Dec. 1, 2005

(86) PCT No.: PCT/EP2005/056381
§ 371 (c)(1),
(2), (4) Date: Apr. 14, 2008

(87) PCT Pub. No.: WO2007/062688
PCT Pub. Date: Jun. 7, 2007

(65) Prior Publication Data
US 2008/0240427 A1    Oct. 2, 2008

(51) Int. Cl.
*H04L 29/06* (2006.01)
*H04L 9/00* (2006.01)
*H04L 9/08* (2006.01)
*H04K 1/00* (2006.01)

(52) U.S. Cl. .......... 380/44; 380/255; 380/262; 380/270; 380/277; 380/278; 713/150

(58) Field of Classification Search .......... 380/255–264, 380/270–272, 277–286, 44–47, 28–30; 713/150–153
See application file for complete search history.

(56) References Cited

U.S. PATENT DOCUMENTS

| | | | | |
|---|---|---|---|---|
| 5,515,307 A * | 5/1996 | Aiello et al. | ................ | 708/254 |
| 2001/0021253 A1 * | 9/2001 | Furuya et al. | ................ | 380/259 |
| 2003/0059052 A1 * | 3/2003 | Cheng | ........................ | 380/274 |
| 2003/0210787 A1 * | 11/2003 | Billhartz et al. | ............. | 380/270 |
| 2003/0219129 A1 * | 11/2003 | Whelan et al. | ................ | 380/270 |
| 2004/0019785 A1 * | 1/2004 | Hawkes et al. | ................ | 713/168 |
| 2005/0117743 A1 * | 6/2005 | Bender et al. | .................. | 380/28 |
| 2005/0210260 A1 * | 9/2005 | Venkatesan et al. | .......... | 713/180 |
| 2005/0265550 A1 | 12/2005 | Tuyls et al. | | |

FOREIGN PATENT DOCUMENTS

JP    61-141231    6/1986

(Continued)

OTHER PUBLICATIONS

Donggang et al., "Establishing Pairwise Keys in Distributed Sensor Networks", ACM Transactions on Information and System Security, vol. 8, No. 1, pp. 41-77, (Feb. 2005).

(Continued)

*Primary Examiner* — Hosuk Song
*Assistant Examiner* — Darren B Schwartz
(74) *Attorney, Agent, or Firm* — Nixon & Vanderhye PC

(57) ABSTRACT

The present invention relates to arrangements and methods for generating keys for cryptographic processing of communication between a first communication unit (200) and a second communication unit (300). The first communication unit (200) and second communication unit (300) are adapted to obtain knowledge about a secret function, wherein the first communication unit comprises: -means for selecting a value z (210), means for calculating the secret function as a function of the selected value z (220) means for processing data with the calculated secret function (230), and means for transmitting the processed data in association with the selected z to the second communication unit (240), wherein the secret function is selected from a set of functions that are almost k-wise independent.

20 Claims, 3 Drawing Sheets

FOREIGN PATENT DOCUMENTS

| | | |
|---|---|---|
| JP | 9-212089 | 8/1997 |
| JP | 2004-080148 | 3/2004 |
| WO | 03/077470 | 9/2003 |

OTHER PUBLICATIONS

Schneier B., "Applied Cryptography, Key Management", Applied Cryptography. Protocols, Algorithms, and Source Code in C., p. 180, (1996).

International Search Report for PCT/EP2005/056381, mailed Jul. 5, 2006.

International Preliminary Report on Patentability with Amended Sheets, mailed Apr. 2, 2008.

Alon et al.: "Simple Constructions of Almost k-wise Independent Random Variables," IEEE Symposium on Foundations of Computer Science, 1992.

De Win et al.: "A fast software implementation for arithmetic operations in GF ($2^n$)," Lect. Notes in Comp. Sci., Springer-Verlag, vol. 1163 (1996), pp. 65-76.

D. Knuth: "The art of computer programming," vol. 2, $2^{nd}$ Ed., Addison-Wesley, 1981.

Matsumoto et al.: "Cryptographic Key Sharing—Key Predistribution System and Its Prototype Implementation," Division of Electrical and Computer Engineering, Yokohama National University, Japan, May 27, 1990, pp. 33-47.

Hanaoka et al.: "Information-Theoretically Secure Key Insulated Encryption: Models, Bounds and Constructions," *IEICE Trans. Fundamentals*, Vo. E87-A, No. 10, Oct. 2004, pp. 2521-2532.

Shi et al.: "Designing Secure Sensor Networks," *IEEE Wireless Communications*, vol. 11, No. 6, Dec. 2004, pp. 38-43.

\* cited by examiner

PRIOR ART

100

200

KEY MANAGEMENT

CROSS-REFERENCES TO RELATED APPLICATIONS

This application is the U.S. national phase of International Application No. PCT/EP2005/056381, filed 1 Dec. 2005, the entire contents of which is hereby incorporated by reference.

FIELD

The technology herein relates to key management, e.g., for encryption or integrity protection, and in particular to generation of keys.

BACKGROUND

The keys e.g., for encryption or integrity protection that are generated by certain example embodiments described herein are suitable for sensor networks. An example of such a sensor network is illustrated in FIG. 1. Further information of sensor networks can be found in "Protocols and Architectures for wireless sensor networks", Holger Karl and Andreas Willig. The sensors of FIG. 1 are e.g. geographically distributed by an aircraft and form a network. The sensor network comprises a plurality of sensors comprising means for collecting and exchanging data. The data collection typically implies gathering of environmental information such as temperature, air pressure, sound, video, still picture, and vibrations. The collected data may be exchanged between the sensors and is typically processed at a central point, wherein at least one of the sensors is required to have direct connectivity to that central point. Therefore, at least one of the sensors comprise relay means. A sensor comprising relay means is also denoted relay sensor. The relay sensors are indicated with crosses and non-relay sensors are indicated with circles in FIG. 1.

The relay sensors are able to transmit and receive information to/from non-relay sensors and they are also able to communicate with a central point in the sensor network. E.g., the relay sensor receives measurement reports from a plurality of non-relay sensors and forward this received information, in addition to its own measurement reports, to a central point in the network. The central point may be a base station of a cellular network, or a vehicle with an antenna that may forward the reports to a central unit for processing the information of the reports.

Sensors are in some cases, as illustrated in FIG. 1, randomly distributed in a geographical area, e.g., dropped from an aircraft. In this case, a "discovery" protocol is first run to determine the nearby sensors having relay capability and/or which sensors that should take the role of the relay sensor. Examples of discovery protocols may be found in the reference Karl and Willig above. This phase may also contain initial security handshakes, where non-relay sensors create secure connections to other (relay) sensors.

Alternatively, the sensors may be distributed in a more orderly fashion, in which case relay sensors are configured as appropriate. A typical example of this is in an apartment building where each apartment could be given a number of associated sensors, wherein at least one of the sensors is a relay sensor communicating with a central point e.g. associated with the building.

The security requirement for the communication in the sensor network depends on the type of sensor application, and the security requirement for the communication between the relay sensors and the non relay sensors requires typically less security than the communication between the relay sensors and the central point in the sensor network due to the short-range characteristics of transmissions from non-relay sensors. However, many applications require that the communication between the relay sensors and the central point be performed in a highly secure way. Certain example embodiments are best suited for the protection of communication between relay sensors and the central point (e.g., a base station), but does not exclude use also for the above mentioned inter-sensor communication.

A common technique for secure communication is to start a communication session by a "handshake" that negotiates or generates keys. However, in critical sensor applications, there is usually a wish for the party that receives data from the sensor to maintain "radio silence", i.e., not to reveal the presence or location of the communicating party. A sensor may also want to limit the amount of signaling to conserve energy; transmitting one bit on the radio interface consumes as much energy as executing roughly 800-1000 local CPU instructions. Likewise, also listening consumes power. In many applications, it is also the case that a specific recipient of the data may be unknown to the sensor, e.g., in broadcast scenarios. Consequently, it can be assumed that the sensor needs to be able to produce the key on its own, and also somehow "hint" to authorized receivers which key it used in a secure and simple way. Therefore, the basis for the key material needs to be stored in the sensor from the beginning, e.g., during manufacture or configuration prior to deployment. A common way to generate new keys from such a basis is to apply a cryptographic function f to a master key $K_{master}$ and to some random data:

$$K_{session} = f(K_{master}, \text{RANDOM}).$$

A first problem with this is that a small sensor may have no sufficiently good source of random data, and the RANDOM will in practice be a "counter" value or similar so that session keys are distinct. However, this degrades the quality of the keys. Another approach would be to use $$K_{new} = F(K_{old}),$$

but this has the drawback that if a certain key is exposed e.g. due to cryptanalysis of the algorithm in which it is used, all future keys are exposed. In addition to this, common to both of the above approaches is that certain applications with very high security requirements simply forbid the cryptographic generation of keys in end-devices as inappropriate/not allowed. If for instance f is a function like the SHA1 hash or the AES algorithm, security of the above approaches relies on cryptographic assumptions, which may turn out to be false, i.e., security is purely heuristic. Applications with high requirements may in fact require a formal, mathematical proof of certain properties such as exact statistical distribution of the keys, which cannot be obtained by the methods just discussed.

Hence, due to the problems of key generation in the sensor and the desire to avoid unnecessary communication, the sensor may need to store a relatively large amount of pre-installed keys that were generated by high-security key generation device, which in turn is problematic due to the constrained environment of the sensor.

BRIEF SUMMARY

Thus, certain example embodiments disclosed herein provide improved key generating methods and arrangements suitable for high security sensors.

Certain example embodiments herein use a k-wise independent function p as a secret function for calculating a key e.g. for encryption purposes. It is shown that it is possible to calculate k-1 statistically independent keys from the k-wise independent function p. It should be noted that it is not required that the secret function is fully k-wise independent, the secret function p may be almost k-wise independent. A copy of p is stored in or communicated to the communicating communication units. When the transmitting communication unit is to communicate, it selects a value z∈GF($2^n$) not used before, it uses the selected z to calculate p(z) and uses p(z) to process the data to be sent. The processed data is sent together with z. On reception of the processed data and the selected z, the receivers obtains z from the data, apply p(z) thus arriving at the same key, which is used to process (e.g., encrypt) the data and "de-process" (e.g., decrypt) the data.

Advantages in certain example embodiments is that the amount of stored keys is limited and new keys from stored keys are provided without relying on cryptography; in particular, the security should not need to rest on a cryptographic assumption.

A further advantage is that forward/backward security is achieved; a successful hostile attack on individual session keys or even sets of such keys does not affect previous or later keys.

A further advantage is that the method is computationally effective and energy efficient.

In addition, certain example embodiments provide a simple means for trusted counterparts to tell which key the sensor uses.

DETAILED DESCRIPTION

Figure 1:
FIG. 1 illustrates an example sensor network.
Figure 1:
Figure 1:
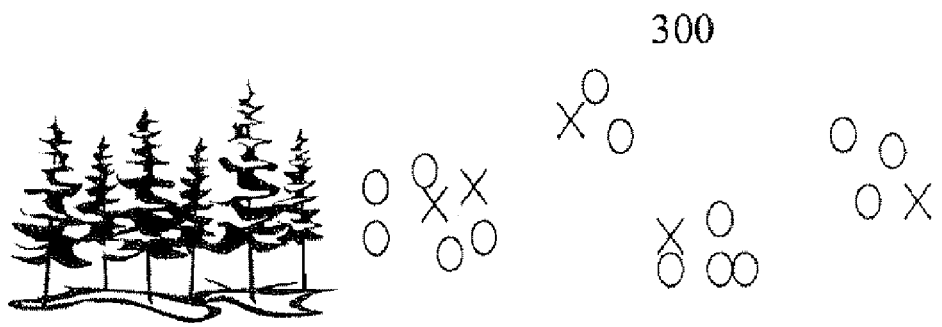

Certain example embodiments disclosed herein will be described more fully hereinafter with reference to the accompanying drawings. It will be appreciated that the embodiments herein are provided by way of example should not be construed as limiting. The disclosed embodiments are provide so that this disclosure will be thorough and complete for those skilled in the art.

In the description, the following notation is used. If S is a set, #S is used to denote the size i.e. the number of elements of S. If S is a set and g is some function, g(S) is the set {g(s)|s∈S}. Finally, let GF($2^n$) denote the finite field of $2^n$ elements.

Certain example embodiments disclosed herein concern methods and arrangements for generating a security key in a communication unit. The case when the key is an encryption key is described, but keys for integrity protection, authentication, or other security objectives could also be generated. The communication unit is preferably associated with a sensor network and the communication unit may be located in a sensor, or in at least another unit, adapted for communication with the sensor. The sensor comprising the communication unit may be a relay sensor and another unit may be a central point as described above. The communication unit is provided, at manufacturing, or at an initial set-up, with a function, p, from a set of almost k-wise independent functions. The information on which p is given to which communication unit is preferably stored in a central database by associating p with the identity of the communication unit.

A set of functions, F, wherein each function in F is mapping from a set A to a set B, is said to be k-wise independent, if, for any distinct k input values from A, the k output values are, over random choices of functions f from F, uniformly distributed in B×B . . . ×B (k copies, which is usually also denoted $B^k$). Another way to describe the k-wise independent function-set is to take a k-dimensional vector of elements from A, (x1, . . . , xk), choose a random function f from F and apply f component wise: y=(f(x1), . . . , f(xk)). Then y is uniformly distributed among the set of all k-dimensional vectors over B.

The k-wise independence is illustrated by the following example: Suppose k=2 and A is the set of integers {0, 1, . . . , 10} and B is the set {0, 1, . . . , 6}. Then F is a set of 2-wise independent functions, if, for any distinct x1, x2 among {0, 1, . . . , 10} and any y1, y2 from {0, 1, . . . , 6}, when choosing f at random from F, the probability that f(x1)=y1 and f(x2)=y2 is 1/49 (since B×B contains 49 elements).

One consequence of the definition of k-wise independence is that if one is told the pairs of values [x1, f(x1)], [x2, f(x2)], . . . [x[k-1], f(x[k-1])] for a randomly selected, unknown f, then this still does not reveal anything of the value f(xk) as long as xk is not in the "observed" set {x1, . . . , x[k-1]}. In other words, the probability that f[xk] takes any value, yk, is still 1/B.

The k-wise independent set of functions is exemplified with a polynomial of degree k-1. It should, however, be noted that functions other than polynomials of degree k-1 may be k-wise independent and used according to certain example embodiments. Another example of such k-wise independent set of functions is the set of all functions between A and B, where A and B are any finite sets.

As stated above, certain example embodiments require that the secret function p is selected from a set of almost k-wise independent functions. The term "almost" implies here that p is a function from a set of k-wise d-independent functions. The d-independence is described below. Let f be a function f: A→B, then k-wise independence means that each k-tuple of values (f(x1), . . . , f(xk)) is 'almost' uniformly distributed. This can be captured by introducing a quantitative 'distance measure', d, measuring how close (f(x1), . . . , f(xk)) is to the uniform distribution. That is, that the set of functions, F, is said to be k-wise d-independent, if the deviation from uniform distribution is no more than d. This can be measured in several ways. For instance, the max-norm can be used. In this case, F is said to be k-wise d-independent if for every (y1, . . . , yk), the probability that (f(x1), . . . , f(xk))=(y1, . . . , yk) is in the range [(#B)^(-k)−d, (#B)^(-k)+d], wherein f is a randomly selected function F∈f. Alternatively, it is possible to use statistical norm where F is k-wise d-independent if, when summing over all (y1, . . . , yk) in B k,|Pr[(f(x1), . . . , f(xk))=(y1, . . . , yk)]−(#B)^(-k)| is no more than d. Examples of such k-wise d-independent functions, can be found in N. Alon, O. Goldreich, J. Hastad, R. Peralta: "Simple Constructions of Almost k-wise Independent Random Variables", IEEE Symposium on Foundations of Computer Science, 1992.

However, it is preferred that the secret function p is from a set of fully k-wise independent functions which implies that d=0 in the examples above.

At communication, the transmitting communication unit selects a z and calculates p(z). The calculated p(z) is used as key material, directly or after additional processing, to process the data to be transmitted, e.g., to encrypt the data. The processed data and the selected z are transmitted to at least one receiving communication unit. If the identity of the sender cannot be assumed known by the receiver, the sender must also send his identity in order for the receiver to retrieve the correct p, corresponding to the sender. The transmission of the z is preferably authenticated and may also be transmitted in a secure way, however the security is not a requirement. In particular, z itself need not be encrypted. The at least one receiving party is already aware of the secret function p or is adapted to retrieve it from a database using the identity of the sender, and by receiving z it is now able to calculate p(z) and in the case of encryption, decrypt the received encrypted data. The calculated key p(z) may be used in both directions, or alternatively a first key p(z1) is used in a first direction and a second key p(z2) is used in a second direction. Another option is that the above-mentioned additional processing "splits" the key into two keys, one for each direction. Further alternatives are that one key may be used for one transmission/session, a new key is generated periodically, e.g., every hour or day, a new key is generated when a pre-defined number of transmissions are performed, or after a pre-defined transferred amount of data, or when the communication unit receives an order to generate a new key.

The selected value z (wherein $z \in GF(2^n)$) may be included in the transmitted data, or transmitted in a separate message.

The sensor preferably avoids re-using the same z twice as that may degrade security. How to achieve this without storing all old z-values will be discussed below.

While not required, it is advantageous if n is a composite number, e.g., that n is of the form n=8w, wherein w is an integer on an 8-bit CPU since very efficient finite field computations are possible. See e.g., De Win, Bosselaers, Vandenberghe, De Gersem, and Vandewalle, "A fast software implementation for arithmetic operations in GF(2^n)", Lect. Notes in Comp. Sci., Springer-Verlag, vol. 1163 (1996), pp. 65-76]. The embodiments described herein may use binary finite fields. However, other embodiments may use other types of finite fields.

The communication unit is provided with the secret function p that is preferably provided at the manufacturing of the communication unit. In the example below, the k-wise independent function p(z) is a randomly chosen polynomial of degree k-1 over $GF(2^n)$:

$$p(x) = c_{k-1}x^{k-1} + c_{k-2}x^{k-2} + \ldots + c_1 x + c_0,$$

where each $c_j \in GF(2^n)$. The possibility $c_{k-1}=0$ is not excluded, though strictly speaking, that would be a polynomial of lower degree. Such p can thus describe a mapping of any $z \in GF(2^n)$ to an element $p(z) \in GF(2^n)$ by evaluating p at z, i.e. p(z).

Since the preparation of the communication unit is typically performed in a factory environment, it can be assumed that the quality of the randomness of p is high. Different communication units are provided with independent and random p(z). Here, n corresponds to the "security level" desired, e.g., n=80, 112, or 128 that may be typical values. Note that such a polynomial can be stored by using kn bits of memory. The value "k" will also define security properties, which are further discussed below. Practical values of k may be of roughly the same size as n, leading to a memory consumption of just over 1 kB.

As mentioned above, a copy of p needs to be stored in or communicated to the communicating communication units, e.g., the communication unit of the sensor and the communication unit of the device that is to communicate with the sensor. For example, when the communication unit of the sensor is to communicate, it selects a value $z \in GF(2^n)$ that is not used before e.g. by picking z-values in lexicographic order to avoid the need to "remember" all previous values, it uses the selected z to calculate p(z) and uses p(z) to process, e.g., encrypt, the data to be transmitted, and e.g., includes the selected z in the data sent. Note that z requires n bits for the representation. On reception, the receiver obtains z from the data and applies p(z) thus arriving at the same key, which is used to process the data. As discussed, the sender may also include its identity in order for the receiver to retrieve the correct p before calculating p(z). The evaluation of p(z) is efficient, since it can be performed by additions and multiplications in $GF(2^n)$ in the order of d, using the so-called Horner's rule which is an efficient method to evaluate a polynomial, e.g., further explained in D. Knuth, "The art of computer programming", vol 2, $2^{nd}$ ed., Addison-Wesley, 1981.

The security properties of certain example embodiments are analyzed below. As stated above p(z) has, for a randomly chosen p, the following properties:

For any fixed $z \in GF(2^n)$, p(z) is completely uniformly distributed in $GF(2^n)$, probability taken over the random choices of p, i.e., for any z and q, $$Pr[p(z)=q] = 2^{-n}.$$

In general, for any, (not necessarily distinct, subset $T \subset GF(2^n)$, for any set $S \subset GF(2^n)$ of distinct elements with #T=#S≦k, the probability that p(S)=T is precisely $2^{-n \#S}$, i.e., the outputs of p are k-wise independent. These properties mean that any set of, at most, k keys will be "as good" as if they had been chosen independently, and completely at random. In particular, even if k-1 sessions are broken by crypto analysis, it does not help an attacker in breaking any other session. Clearly, if as many as k sessions are broken, then security also of future sessions is lost, but below it is shown how the damage can be limited. If k-1=n=100 is selected, it is very unlikely that 100 sessions will be broken.

In one embodiment, in cases where cryptography is acceptable, the method may be combined with conventional cryptography. This will provide additional damage control as mentioned above. As mentioned, if k session keys are compromised, the security of the above-mentioned methods according to prior art is lost, since the polynomial p can then be interpolated and reconstructed. For example, in the case of k=2, reconstruction of the polynomial (which is now an affine function of the form p(x)=ax+b) is done by solving the system of equations $$y1 = az1 + b$$

$$y2 = az2 + b$$

where a, b are unknown, z1, z2 are obtained by listening to the communication and y1, y2 correspond to the compromised keys. Clearly, with z1 being distinct from z2, we have a non-degenerate equation system with as many equations as unknowns, and hence can be solved for (a, b). Another way to view this is to fit a straight line going through the points (z1, y1] and [z2, y2], thereby determining all other points on this line. In general, a non-degenerate equation system with k equations and k unknowns need to be solved e.g., by standard Gaussian methods or other interpolation methods.

If one wants to avoid all risks associated with compromise of k (or more) session keys, it is in general important that more than k-1 session keys never are generated from the same p. More than k-1 keys may be generated, but it would no longer be guaranteed to have full security if all keys are compromised. Specifically, $k_{11}, k_{12}, \ldots, k_{1k-1}$, are generated using a first (random) polynomial $p_1$ that is the replaced by $p_2$, e.g., $$p_2 = f(p_1),$$

for some suitable, one-way, cryptographic function f, e.g., a one-way hash function. $k_{21}, k_{22}, \ldots, k_{2k-1}$ is then generated from $p_2$ and so on. Note that the security arguments now become more heuristic/cryptographic. However, "forwards" and "backwards" security are provided even if all k-1 keys generated from some $p_j$ are compromised. The backwards security holds even if the sensor is broken into in the physical sense.

Figure 3A:
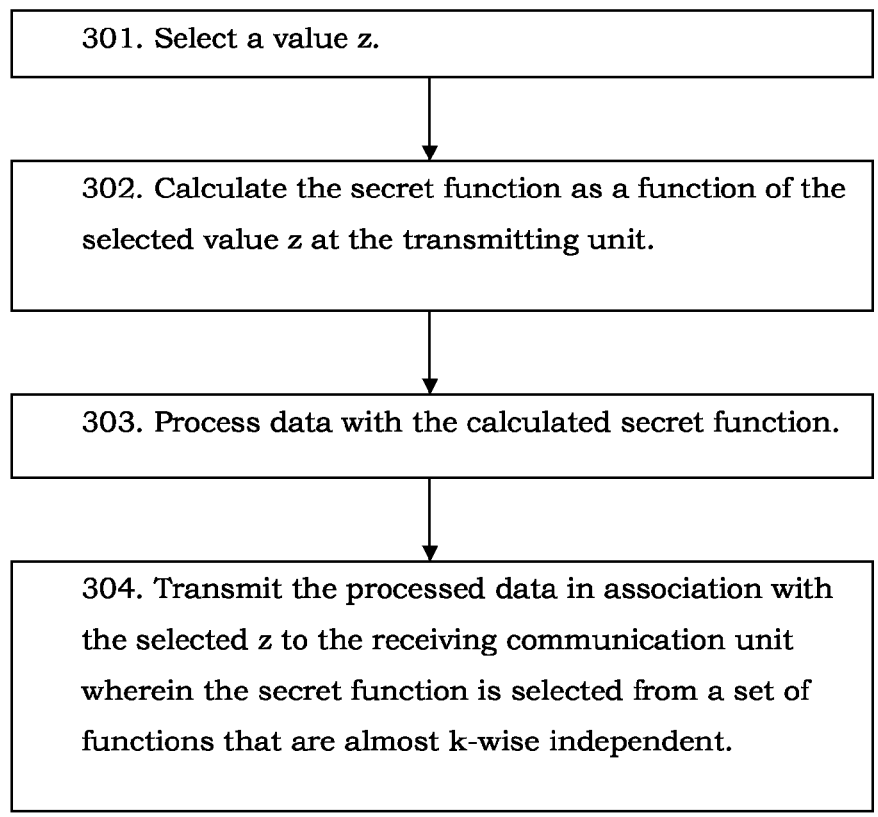
FIG. 3a-3b are flow charts illustrating exemplary methods according to certain example embodiments.
Figure 3B:
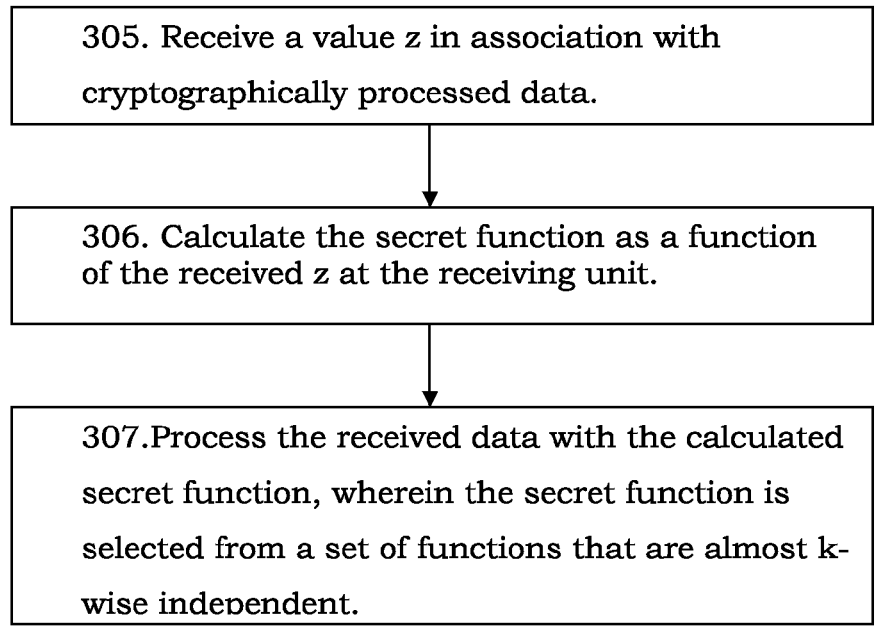

Turning now to FIGS. 3a and 3b that show flow charts of the methods of according to certain example embodiments. The flow charts relate to a method for generating keys for cryptographic processing of communication between a transmitting communication unit and a receiving communication unit, wherein the transmitting communication unit and the receiving communication unit are adapted to obtain knowledge about a secret function. The method illustrated in FIG. 3a comprises the steps of:

301. Select a value z.
302. Calculate the secret function as a function of the selected value z at the transmitting unit.
303. Process data with the calculated secret function.
304. Transmit the processed data in association with the selected z to the receiving communication unit wherein the secret function is selected from a set of functions that are almost k-wise independent.

The flowchart shown in FIG. 3b relates further to methods for generating keys for security processing of communication between a transmitting communication unit and a receiving communication unit. The transmitting communication unit and the receiving communication unit are adapted to obtain knowledge about a secret function. The method illustrated in the flowchart of FIG. 3b comprises the steps of:

305. Receive a value z in association with cryptographically processed data.
306. Calculate the secret function as a function of the received z at the receiving unit.
307. Process the received data with the calculated secret function, wherein the secret function is selected from a set of functions that are almost k-wise independent.

The methods may be implemented by a computer program product. The computer program product may be stored on a computer usable medium, comprising readable program for causing a processing means in the communication unit, to control the execution of the steps of the methods. It should be noted that the methods might also be implemented by hardware or a combination of hardware and software.

Figure 2:
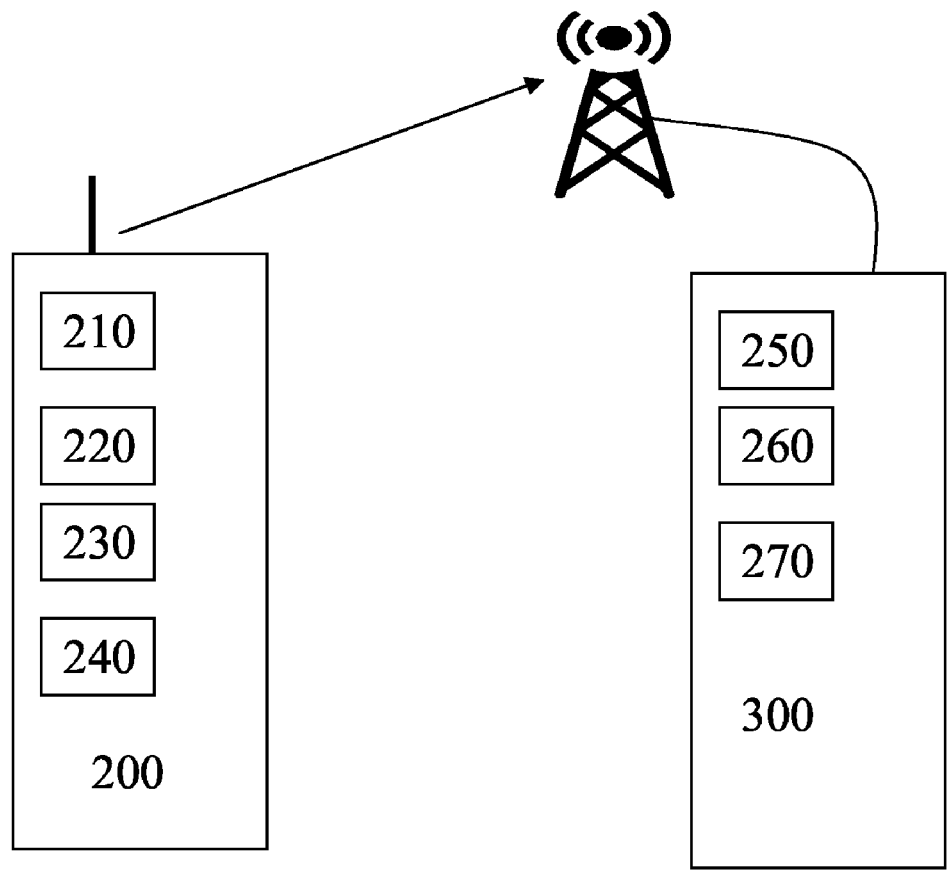
FIG. 2 illustrates an example transmitting and a receiving communication unit.

FIG. 2 shows two communicating communication units, wherein a transmitting communication unit (200) is implemented in a sensor and a receiving communication unit (300) is implemented in a central point associated with a base station. The transmitting communication unit (200), also denoted the first communication unit, comprises means for generating a key for cryptographic processing of communication between the transmitting communication unit and the receiving communication unit, also denoted the second communication unit. Both communication units are adapted to obtain knowledge about a secret function, e.g., by retrieving the secret function from a database or the secret function may be stored in the communication units at the manufacturing. The transmitting communication unit comprises means for: selecting a value z (210), calculating the secret function as a function of the selected value z (220), processing data with the calculated secret function (230), transmitting z together with the processed data to the second communication unit (240). The receiving communication unit comprises means for receiving a value z together with cryptographically processed data (250), means for calculating the secret function as a function of the received number z at the receiving unit (260), and means for processing data the received data with the calculated secret function (270). The secret function is selected from a set of almost k-wise independent functions.

Moreover, certain example embodiment may include pre-configuring a device that is adapted to pre-configure the communication units with the secret function that is selected from a set of functions that are almost k-wise independent.

While the embodiments described here are the preferred embodiments, various alternatives, modifications and equivalents may be used. Therefore, the above embodiments should not be taken by way of limitation.

While the embodiments described herein are considered what is presently the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for generating keys for cryptographic processing of communication between a transmitting communication unit and a receiving communication unit of a sensor network, wherein the transmitting communication unit and the receiving communication unit are adapted to obtain knowledge about a secret function, the method comprising:
   selecting a value from a plurality of values,
   calculating a key based on the secret function applied to the selected value,
   processing data with the calculated key, and
   transmitting the processed data in association with the selected value to the receiving communication unit,
   wherein the secret function is from a set of functions where the set of functions is almost k-wise independent,
   wherein the secret function is shared between the communication units and pre-configured independently and randomly to the communication units, and
   the generated key is only based on information of the transmitting communication unit and that one of the communicating units is a central point and the other is a sensor wherein the key is generated securely despite k being independent of the number of sensors in the sensor network.

2. A method for generating keys for security processing of communication between a transmitting communication unit and a receiving communication unit of a sensor network, wherein the transmitting communication unit and the receiving communication unit are adapted to obtain knowledge about a secret function, the method comprising:
   receiving a value in association with cryptographically processed data, the value among a finite set of values,
   calculating a key based on the secret function and the received value at the receiving unit, and
   processing the received data with the generated key,
   wherein the secret function has been selected from a set of functions, wherein the set of functions is almost k-wise independent, and
   wherein the secret function is shared between the communication units and pre-configured independently and randomly to the communication units,
   the generated key is only based on information of the transmitting communication unit and that one of the communicating units is a central point and the other is a sensor wherein the key is generated securely despite k being independent of the number of sensors in the sensor network.

3. The method according to claim 1, wherein the set is k-wise independent.

4. The method according to claim 1, wherein the set of functions comprises polynomials that are defined over a finite field, the polynomials of degree k-1.

5. The method according to claim 1, further comprising:
replacing the secret function with a new function when the secret function has been used for generation of at most k-1 keys, and
generating the new function based on cryptographic processing of the secret function.

6. The method according to claim 5, wherein the generation of the new function is based on a one-way hash function.

7. The method according claim 1, further comprising:
including an identity of the transmitting communication unit in order for the receiving communication unit to retrieve the secret function based on the identity before calculating the secret function.

8. The method according claim 2, further comprising:
receiving an identity of the transmitting communication unit; and
retrieving the secret function based on the received identity before the calculation of the secret function.

9. A computer program product loaded into a non-transitory internal memory of a computer within a communication unit and comprising software code structure that is configured to perform the method according to claim 1.

10. A non-transitory computer readable storage medium storing computer readable program instructions for causing a computer, within a communication unit, to perform a method according to claim 1.

11. A first communication unit configured to generate keys for cryptographic processing that are set to be used for communication between the first communication unit and a second communication unit in a sensor network, wherein the first communication unit and second communication unit are knowledgeable regarding secret function, the first communication unit comprising:
a processing system configured to cause:
selecting a value from among a set of values;
calculating a key from the secret function and the selected value;
processing data with the calculated key; and
transmitting the processed data in association with the selected value to the second communication unit,
wherein the secret function is from a set of functions, wherein the set of functions is almost k-wise independent,
wherein the secret function is shared between the first and second communication units and pre-configured independently and randomly to the first and second communication units, and that the key is only based on information of the first communication unit, and that one of the first and/or second communicating units is a central point and the other is a sensor wherein the key is generated securely despite k being independent of the number of sensors in the sensor network.

12. A communication unit configured to generate keys for communications that are to be sent over a communications network, the communication unit adapted to obtain a secret function, the communication unit comprising:
a processing system configured to cause:
receiving a value a predetermined set of values;
generating a key based on applying the received value to the secret function
processing data with the generated key; and
transmitting the processed data to a receiving device,
wherein the secret function is one of a plurality of functions and the plurality is at least substantially k-wise independent,
wherein the secret function is shared with at least one other communication unit, and that the generated key is based on information from the at least one other communication unit, and wherein the generated key is independent of a number of units within the communications network.

13. The communication unit according to claim 11 wherein the set is k-wise independent.

14. The communication unit according to claim 11 wherein the set of functions comprises polynomials that are defined over a finite field, the polynomials being of degree k-1.

15. The communication unit according to claim 11, wherein the processing system is further configured to cause:
replacing the secret function with a new function when the secret function has been used for generation of at most k-1 keys, and
generating the new function based on cryptographic processing of the secret function.

16. The communication unit according to claim 15, wherein the new function is generated based on a one-way hash function.

17. The communication unit according claim 11, wherein the processing system is further configured to cause: including an identity of the first communication unit in order for the second unit to retrieve the secret function based on the identity before calculating the secret function.

18. The communication unit according claim 12, wherein the processing system is further configured to cause:
receiving an identity of the first communication unit; and
retrieving the secret function based on the received identity before the calculation of the secret function.

19. A pre-configuring device adapted to pre-configure the first communication unit according to claim 11 with the secret function.

20. A pre-configuring device adapted to pre-configure the second communication unit according to claim 12 the secret function.

* * * * *

UNITED STATES PATENT AND TRADEMARK OFFICE
CERTIFICATE OF CORRECTION

| | | |
|---|---|---|
| PATENT NO. | : 8,014,523 B2 | Page 1 of 1 |
| APPLICATION NO. | : 12/090185 | |
| DATED | : September 6, 2011 | |
| INVENTOR(S) | : Naslund | |

It is certified that error appears in the above-identified patent and that said Letters Patent is hereby corrected as shown below:

In Column 4, Line 50, delete "B k,|Pr" and insert -- B^k, |Pr --, therefor.

In Column 9, Line 35, in Claim 11, delete "secret" and insert -- a secret --, therefor.

Signed and Sealed this
Sixth Day of March, 2012

David J. Kappos
*Director of the United States Patent and Trademark Office*